(12) United States Patent
Domanski

(10) Patent No.: US 11,522,210 B2
(45) Date of Patent: Dec. 6, 2022

(54) ALIGNMENT APPARATUS AND METHODS OF ALIGNMENT

(71) Applicant: Ceres Intellectual Property Company Limited, West Sussex (GB)

(72) Inventor: Tomasz Domanski, West Sussex (GB)

(73) Assignee: Ceres Intellectual Property Company Limited, West Sussex (GB)

( * ) Notice: Subject to any disclaimer, the term of this patent is extended or adjusted under 35 U.S.C. 154(b) by 155 days.

(21) Appl. No.: 17/076,597

(22) Filed: Oct. 21, 2020

(65) Prior Publication Data

US 2021/0119241 A1    Apr. 22, 2021

(30) Foreign Application Priority Data

Oct. 22, 2019   (GB) ...................................... 1915294

(51) Int. Cl.
   *H01M 8/2465*    (2016.01)
(52) U.S. Cl.
   CPC ................................ *H01M 8/2465* (2013.01)
(58) Field of Classification Search
   CPC .............................. H01M 8/24; H01M 8/2465
   See application file for complete search history.

(56) References Cited

U.S. PATENT DOCUMENTS

| 6,358,641 | B1 | 3/2002 | Mease |
| 8,795,921 | B2 | 8/2014 | Rock et al. |

(Continued)

FOREIGN PATENT DOCUMENTS

| CA | 2990280 A1 | 3/2018 |
| EP | 2980422 A1 | 7/2014 |

(Continued)

OTHER PUBLICATIONS

UKIPO; Combined Search and Examination Report under Sections 17 and 18(3) dated Apr. 24, 2020 in corresponding United Kingdom Application No. 1915294.1.

(Continued)

*Primary Examiner* — Olatunji A Godo
(74) *Attorney, Agent, or Firm* — Snell & Wilmer L.L.P.

(57) ABSTRACT

An alignment dowel comprises a body extending along a longitudinal axis, the body comprising a plurality of resilient vanes that extend generally perpendicular to the longitudinal axis, and an actuator portion. The stack has openings of a predetermined diameter. The vanes are arranged around the longitudinal axis so as to extend along the axis and project radially outwards to define an outer diameter of the body. The actuator portion is operable to move the vanes between a collapsed configuration in which the outer diameter is smaller than the predetermined diameter, and an expanded configuration in which the outer diameter of the body is greater than in the collapsed configuration. A stack assembly jig, comprises a tool base on which a stack of components can be positioned. The tool base has guide holes that are no smaller than the predetermined diameter and are positioned to correspond to the position of the openings in the stack. A base plate carries an array of alignment dowels arranged to correspond to the positions of the guide holes. The base plate is moveable relative to the tool base such that the alignment dowels can project through the guide holes and into the component openings. The actuators are operable to align the components in the stack. A method for aligning components of a cell stack using an alignment dowel, comprises arranging cells adjacent one another in a stack, wherein the cells have internal alignment features, wherein each alignment feature includes an engaging surface with which the alignment dowel is configured to engage and disengage when (Continued)

located within said alignment feature; and locating the alignment dowel in the alignment features in the collapsed configuration and operating the actuator to move the alignment dowel to the expanded configuration to align the cells.

21 Claims, 10 Drawing Sheets

(56) References Cited

U.S. PATENT DOCUMENTS

| 2006/0051651 | A1* | 3/2006 | Rock | H01M 8/242 |
| | | | | 211/49.1 |
| 2015/0111125 | A1 | 4/2015 | Farrington | |

FOREIGN PATENT DOCUMENTS

| EP | 2980422 | A1 | 2/2016 |
|----|---------|----|--------|
| GB | 1011083 | | 11/1965 |
| GB | 1011083 | A | 11/1965 |
| GB | 2006318 | A | 5/1979 |
| SU | 1204303 | A | 1/1986 |
| SU | 1715694 | A1 | 2/1992 |
| WO | 0235628 | A1 | 5/2002 |
| WO | 03075382 | A2 | 9/2003 |
| WO | 2004089848 | A1 | 10/2004 |
| WO | 2005078843 | A1 | 8/2005 |
| WO | 2006079800 | A1 | 8/2006 |
| WO | 2006106334 | A1 | 10/2006 |
| WO | 2007085863 | A1 | 8/2007 |
| WO | 2007110587 | A2 | 10/2007 |
| WO | 2008001119 | A2 | 1/2008 |
| WO | 2008003976 | A1 | 1/2008 |
| WO | 2008015461 | A1 | 2/2008 |
| WO | 2008053213 | A1 | 5/2008 |
| WO | 2008104760 | A1 | 9/2008 |
| WO | 2008132493 | A2 | 11/2008 |
| WO | 2009090419 | A2 | 7/2009 |
| WO | 2010020797 | A1 | 2/2010 |
| WO | 2010061190 | A2 | 6/2010 |
| WO | 2015004419 | A1 | 1/2015 |
| WO | 2015136295 | A1 | 9/2015 |
| WO | 2016083780 | A1 | 6/2016 |
| WO | 2016124928 | A1 | 8/2016 |
| WO | 2016124929 | A1 | 8/2016 |
| WO | 2016128721 | A1 | 8/2016 |
| WO | 2019002829 | A1 | 1/2019 |
| WO | 2019034855 | A1 | 2/2019 |
| WO | 2019034856 | A1 | 2/2019 |

OTHER PUBLICATIONS

Combined Search and Examination Report dated Apr. 15, 2021 in Great Britain Application No. 2016560.1.
Intention to Grant dated Mar. 31, 2022 in Great Britain Application No. 2016560.1.
Decision to Grant dated Sep. 10, 2021 in Russian Application No. 2020134521/09.
UKIPO; Combined Search and Examination Report under Sections 71 and 18(3) dated Apr. 15, 2021 for GB Application No. 2016560.1.

* cited by examiner

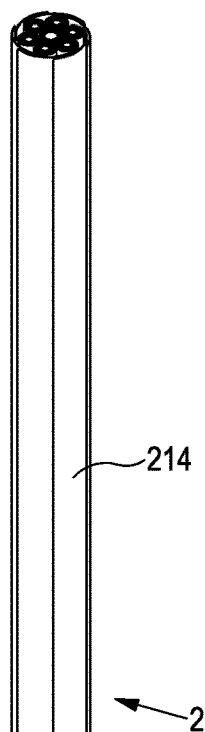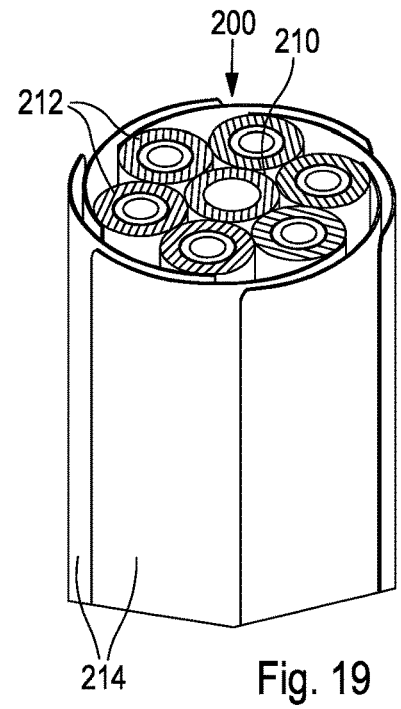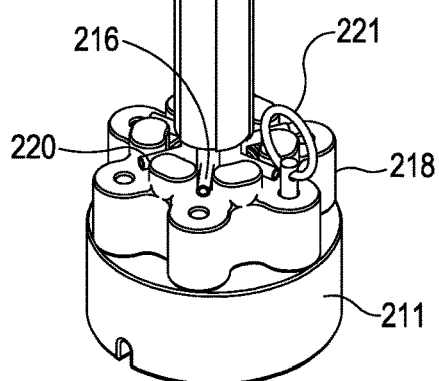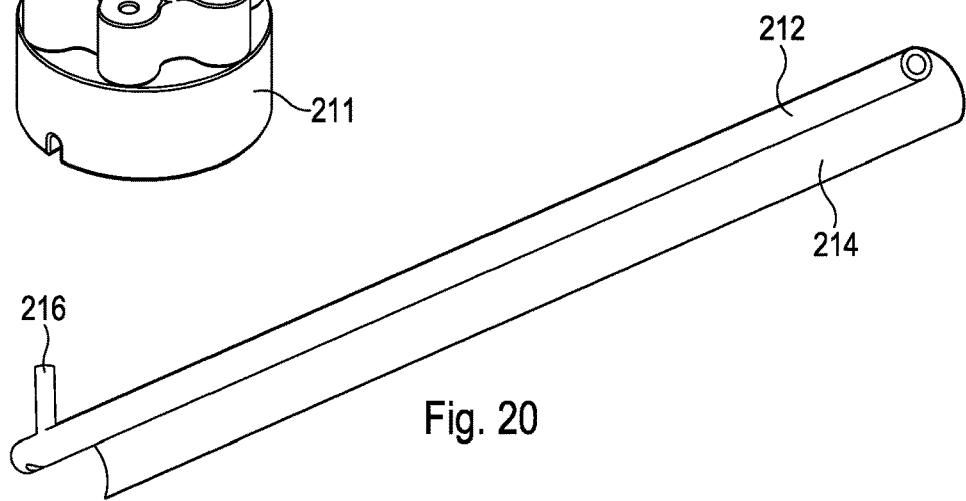
Fig. 18
Fig. 19
Fig. 20

ALIGNMENT APPARATUS AND METHODS OF ALIGNMENT

CROSS-REFERENCE TO RELATED APPLICATION

This application claims the benefit of United Kingdom Application No. 1915294.1, filed Oct. 22, 2019, and entitled ALIGNMENT APPARATUS AND METHODS OF ALIGNMENT, the contents of which are hereby incorporated herein by reference, to the extent such contents do not conflict with the present disclosure.

TECHNICAL FIELD

The present invention is concerned with alignment apparatus and methods of alignment. In particular, it is concerned with an alignment dowel, a cell stack incorporating same, and methods of alignment of stacks of components.

BACKGROUND OF THE INVENTION

Teachings of fuel cells, fuel cell stacks, fuel cell stack assemblies, and heat exchanger systems, arrangements and methods are well known to one of ordinary skill in the art, and in particular include WO02/35628, WO03/075382, WO2004/089848, WO2005/078843, WO2006/079800, WO2006/106334, WO2007/085863, WO2007/110587, WO2008/001119, WO2008/003976, WO2008/015461, WO2008/053213, WO2008/104760, WO2008/132493, WO2009/090419, WO2010/020797, WO2010/061190, WO2015/004419, WO2015/136295, WO2016/124929, WO2016/124928, WO2016/128721, WO2016/083780, WO2019/002829, WO2019/034855, and WO2019/034856. U.S. Publication No. 2015/111125 discloses alignment features and methods for their use for purposes of aligning adjacent bipolar plates. Canadian Publication No. CA2990280 discloses fuel cells with improved component alignment and stabilization. U.S. Pat. No. 8,795,921 discloses an alignment system and method for assembling a fuel cell stack.

The assembly of fuel cell stacks (typically comprising, e.g., a base plate, a plurality of fuel cell stack layers, and an end plate, with gaskets interposed between the base plate, fuel cell stack layers, and the end plate so as to assist in effecting a gas seal between adjacent stack components) can be difficult and complex. In particular, if gaskets are incorrectly positioned then they can block fluid flow passageways. Even partial blockage of fluid flow passageways can significantly impact the performance of the resulting fuel cell stack assembly, e.g., reducing power output and efficiency and shortening stack life.

Therefore, correct and accurate positioning of fuel cell stack components, particularly gaskets, is highly desirable.

The present invention seeks to provide improved methods and apparatus suitable for use in this field.

SUMMARY OF THE INVENTION

According to a first aspect of the present invention, there is provided an alignment dowel for aligning a stack of components, the alignment dowel comprising:
(i) a body extending along a longitudinal axis, the body comprising a plurality of resilient vanes that extend generally perpendicular to the longitudinal axis, and
(ii) an actuator portion.

The stack of components has openings of a predetermined diameter. The resilient elongate vanes are arranged around the longitudinal axis so as to extend along the longitudinal axis and project radially outwards from the longitudinal axis to define an outer diameter of the body. The actuator portion is operable to move the vanes between a collapsed configuration in which the outer diameter is smaller than the predetermined diameter, and an expanded configuration in which the outer diameter of the body is greater than in the collapsed configuration.

Preferably, the alignment dowel comprises at least three resilient vanes. More preferably, there are at least seven resilient vanes. For example, there may be up to 14 vanes. The optimum number of vanes will depend on the shape of the vanes, the flexibility of the vane material, and the nature of the material which is to be aligned.

In certain embodiments, the resilient vanes are curved in the same direction, e.g., a clockwise or anticlockwise direction when the dowel is viewed end on. In particular, this can assist with alignment by rotating the alignment dowel. For example, where a gasket protrudes slightly into one side of a passageway, rotation of the alignment dowel and its vanes can then nudge the gasket out of the passageway. The vanes can also be bent to achieve the same effect. Flat sections having one or more bends to deviate the blade can be used. Also, combinations of curves, bends, and flat sections can be used.

The dowel can comprise a central rod and an array of elongate tubes arranged around the rod, wherein each tube is substantially parallel to the rod and carries a resilient vane that projects outward from the array. Each tube can be rotated so as to adjust the outward projection of its vane and so adjust the outer diameter of the body. The actuator can comprise a rotatable collar positioned around a first end of the array, wherein each tube includes a formation at the first end that engages in a corresponding formation in the collar such that rotation of the collar relative to the array acts to rotate each tube to adjust the outer diameter of the body. The dowel can further comprise a bracket positioned at a second, opposite end of the array, wherein the bracket includes formations that engage with the tubes to maintain the tubes parallel to the central rod. Each vane can project tangentially from its tube.

In certain embodiments, the body comprises a rod from which the plurality of resilient vanes extends. For example, in the case of spring steel vanes, a central rod may be provided to which the vanes are mounted (for example, welded or brazed). Thus, the body can be provided with a central rod. In certain other embodiments (for example, where the vanes are fabricated from nylon or PTFE), a central rod does not have to be provided and instead the vanes can be connected together. For example, additive manufacturing (e.g., 3D printing) can be used to form an alignment dowel from a chosen material without a central dowel.

Where the resilient vanes are attached to a rod, they may be attached along their length. For example, the vanes may be integrally formed or attached.

In certain embodiments, the resilient vanes form a spiral around the rod.

A second aspect of the invention provides a stack assembly jig, comprising: a tool base on which a stack of components can be positioned, wherein the components have openings of a predetermined diameter and the tool base has guide holes that are no smaller than the predetermined diameter and are positioned to correspond to the position of the openings of the components in the stack; and a base plate carrying an array of alignment dowels, wherein the alignment dowels are arranged to correspond to the positions of the guide holes; wherein the base plate is moveable relative to the tool base such that the alignment dowels can project through the guide holes and into the component openings, and wherein the actuators are operable to align the components in the stack.

The base plate can be located below the tool base and can be raised so that the alignment dowels project into the component openings. The actuators can be located on the base plate.

A method of assembling a stack of components using the assembly jig comprises: positioning a stack of components on the tool base such that the openings overlap with the guide holes; moving the base plate with the vanes on the dowels in the collapsed configuration so that the dowels project through the guide holes and the openings; and operating the actuators so that the vanes move to the expanded configuration so as to align the components.

The method can further comprise, after alignment of the components, operating the actuator to return the vanes to the collapsed configuration; adding further components to the stack so that the dowels project through the openings of the further components; and operating the actuators so that the vanes move to the expanded configuration so as to align the further components. This can include moving the base plate closer to the tool base so that the dowels project further from the tool base as the height of the stack increases.

In particular, the stack of components which the alignment dowel is to be used to align can include a plurality of cells each defining a common datum opening and a corresponding gasket interposed between adjacent cells, each gasket defining a gasket opening, the plurality of cells and gaskets stacked (i.e., in stack alignment) such that the common datum openings and gasket openings define a passageway.

For example, a passageway may take the form of a fuel duct, for example, as detailed and illustrated in WO 2019/034855.

Cell stack assembly apparatus are widely used to assist in the assembly of fuel cell stacks. Such apparatus typically includes datums against which fuel cells (also referred to as fuel cell stack layers and fuel cell stack repeat layers) are arranged. With the fuel cell stack layers typically formed of metal, e.g., from steel, this provides a rigid frame against which other components (such as gaskets) can be aligned. However, without fixing other components, such as gaskets, in place before placing the next fuel cell stack repeat layer on top, the gaskets are prone to move. In particular, gaskets can expand when compressive force is placed upon them (for example by stack compression means). As detailed above, even partial blockage of a passageway can have an adverse impact upon the fuel cell stack assembly.

Therefore, correct alignment of stack components, such as gaskets, is critical.

The alignment dowel of the present invention can therefore be aligned against (i.e., aligned with) common datum openings of a passageway. The alignment dowel can therefore, in turn, be used to provide a soft datum to align gaskets (and other stack components).

The resilient vanes can extend radially outwards from the longitudinal axis.

The alignment dowel is longitudinally elongate. Preferably, the ratio (when not in use, i.e., in a relaxed state, also referred to as an unconstrained or expanded state) of the length of the alignment dowel to an outer diameter (preferably, the maximum outer diameter) of the resilient vanes is at least 3:1. In certain embodiments, such a (relatively short) alignment dowel is used and actuated repeatedly as the stack of components is assembled, with the components at or near the top of the stack being aligned. In other embodiments, the alignment dowel is longer and is used and actuated less frequently. The exact dimensions of the alignment dowel can be chosen as appropriate for the particular stack of components to be aligned and the additional equipment being used for stack assembly. For example, in certain embodiments the ratio of the length of the alignment dowel to an outer diameter of the resilient vanes is between 3:1 and 7:1.

Preferably, the design and resilience of the dowel vanes is such that they are not too stiff: for example, the design and resilience of the dowel vanes are preferably selectively configured such that the outer diameter of the uncompressed/expanded dowel vanes is at least 5% bigger than that of a first, smaller compressed/collapsed diameter that the dowel vanes are capable of adopting if inserted into an opening (such as a passageway) of that diameter and where they would be capable of exerting a sufficient aligning force.

Preferably, upon actuation, the vanes are inherently capable of compressing/collapsing to a second, even smaller compressed/collapsed diameter to allow dowel extraction, whereby the outer diameter of the uncompressed/expanded dowel vanes is at least 10% bigger than the second compressed/collapsed diameter.

The vanes need not be located along the entire length of the body. For example, in certain embodiments the resilient vanes are located at one end of the alignment dowel and the actuator portion is located at the other end of the alignment dowel, with a portion of the body extending between them without any vanes.

Examples of suitable material for the vanes include plastics, such as nylon or PTFE (polytetrafluoroethylene), and spring steel.

The vanes can be arranged so that rotation of the alignment dowel in a first direction reduces friction on the vanes (against the stack components), and rotation of the alignment dowel in the opposite second direction increases friction on the vanes. Thus, when in a passageway, the alignment dowel can be rotated in the second direction in order to align stack components, and can then be rotated in the opposite direction to reduce friction and ease its removal from the passageway.

Thus in certain embodiments, either:
(a) the resilient vanes are curved in a clockwise direction and the alignment dowel is arranged to in-use reduce friction on the vanes by rotation of the alignment dowel in the anti-clockwise direction and to in-use increase friction on the vanes by rotation of the alignment dowel in the clockwise direction, or
(b) the resilient vanes are curved in an anti-clockwise direction and the alignment dowel is arranged to in-use reduce friction on the vanes by rotation of the alignment dowel in the clockwise direction and to in-use increase friction on the vanes by rotation of the alignment dowel in the anti-clockwise direction.

In certain embodiments, the resilient vanes have a concertina profile.

In certain embodiments, either:
(a) the resilient vanes are curved in a clockwise direction and the alignment dowel is arranged to collapse by rotation of the alignment dowel in the anti-clockwise direction and to expand by rotation of the alignment dowel in the clockwise direction, or
(b) the resilient vanes are curved in an anti-clockwise direction and the alignment dowel is arranged to collapse by rotation of the alignment dowel in the clockwise direction and to expand by rotation of the alignment dowel in the anti-clockwise direction.

The actuator portion may be shaped and dimensioned according to the intended way in which the alignment dowel is to be actuated. For example, the actuator portion may be shaped so that the alignment dowel can be inserted, removed and/or rotated using an external tool. Alternatively, it may be a grip portion (for example, a handle portion) that is shaped and dimensioned for convenient operation by hand.

The actuator portion may have a smaller diameter than an outer diameter of the resilient vanes. Thus, for example, during a manual assembly process an alignment dowel may be inserted into a partially assembled stack of components and rotated to align those components. Additional stack components can then be put in place without the alignment dowel being removed. The alignment dowel can then be rotated into its low friction/collapsed configuration, moved upwards, and rotated into its increased friction/expanded configuration in order to align the newly added stack components. Since the additional stack components are inserted over the top of the alignment dowel it may be desirable to reduce the possibility of damage to them in the event that they contact the alignment dowel. To assist in achieving this, the alignment dowel may additionally comprise a removable rounded or domed cover for the actuator portion in embodiments where the actuator is uppermost. The cover preferably has a smaller diameter than an outer diameter of the resilient vanes. With the cover in place, the actuator portion is not exposed and so the risk of any damage to stack components by accidental contact with the grip portion during stack assembly is minimised. The cover can be removed when desired to allow access to the grip portion so that the alignment dowel can be actuated (e.g., rotated).

In other embodiments, the actuator portion can have an outer diameter greater or equal than an outer diameter of the vanes, and can be inserted, actuated and removed as desired and appropriate.

Where the alignment dowel is moved and the movement might exert an upwards force on the stack of components, an at least one retainer may be placed on the top of the stack of components in order to prevent their upwards movement.

According to a third aspect of the present invention, there is provided a cell stack comprising a plurality of cells arranged adjacent one another in a stacked configuration, the cells having internal alignment features provided within components of each cell that allow them to be aligned relative to one another and additionally comprising an alignment dowel according to the present invention located within the alignment features, wherein each alignment feature includes an engaging surface with which an alignment dowel is configured to selectively engage and disengage when located within the alignment feature.

In particular, the alignment dowel can be configured to selectively engage and disengage with the alignment features when inserted within the alignment feature.

Preferably, the internal alignment features are openings defined in the cells, for example, ports in the cells. The openings can act as datum openings.

For example, the alignment features can define a passageway in which is located the alignment dowel. The passageway can also be described as an "alignment passageway."

The cell stack can comprise additional components interposed between adjacent cells, for example, components which are free to move but which need to be positioned, for example, relative to alignment features in a cell, for example, an opening, such as a port. Such components can include (but are not limited to) gaskets and spacers. Such additional components can be at least partially located adjacent the alignment features of adjacent cells such that they can be aligned by the alignment dowel when it is located within the alignment features. For example, each gasket can define a gasket opening, and the alignment dowel can thus be used to position the gaskets relative to internal alignment features, such as alignment openings, in adjacent cells. In other embodiments, the alignment dowel may be used to ensure that the additional components interposed between cells project between (or beyond) the alignment features of adjacent cells. For example, the alignment dowel may be used to nudge the additional components out of (or ensure that they do not extend or protrude into, i.e., prevent them from extending or protruding into) a passageway defined between alignment features of adjacent cells.

Thus, the cell stack can comprise cells with respective internal ports aligned in the stacking direction to form internal manifolds and gaskets interposed between adjacent cells to seal the manifolds. In certain embodiments, the alignment dowel is located within the alignment ports and aligns (i.e., aligning) the gaskets relative to the alignment ports.

In certain embodiments, each cell has more than one internal alignment feature. In certain embodiments, each cell has a plurality of alignment openings. Thus, a plurality of passageways can be defined.

Thus, in certain embodiments, there is provided a cell stack comprising a plurality of stack components, the stack components including a plurality of cells each defining a common datum opening and a corresponding gasket interposed between adjacent cells, each gasket defining a gasket opening, the plurality of cells and gaskets arranged adjacent one another in a stacked configuration (i.e., in stack alignment) such that the common datum openings and the gasket openings define a passageway, and additionally comprising an alignment dowel according to the present invention located in the passageway. Preferably, the alignment dowel is removably located in the passageway.

In certain embodiments, each cell defines a plurality of datum openings. For example, in certain embodiments each cell defines first and second datum openings. In other embodiments, each cell defines first, second and third datum openings. In other embodiments, each cell defines first, second, third and fourth datum openings. In such embodiments, corresponding gaskets are interposed between adjacent cells so as to define an additional passageway or passageways as appropriate. Thus, first datum openings (and corresponding gasket openings) can define a first passageway; second datum openings (and corresponding gasket openings can define a second passageway; third datum openings (and corresponding gasket openings) can define a third passageway, etc.

Such passageways can also be referred to as "chimneys."

In certain embodiments, the cells are fuel cells. In certain embodiments, they are solid oxide fuel cells. Other types of fuel cell are widely known, and the present invention can be used with them as appropriate.

In the various aspects of the present invention where reference is made to solid oxide fuel cells, the solid oxide fuel cells can include solid oxide electrolyser cells (also referred to as solid oxide electrolysis cells), i.e., solid oxide fuel cells configured to run or running in a regenerative mode so as to convert water into hydrogen and oxygen.

The invention also provides a method for aligning a plurality components of a cell stack using an alignment dowel, comprising: arranging a plurality of cells adjacent one another in a stacked configuration, wherein the cells have internal alignment features provided within components of each cell that allow them to be aligned relative to one another, wherein each alignment feature includes an engaging surface with which the alignment dowel is configured to selectively engage and disengage when located within said alignment feature; and locating the alignment dowel in the alignment features in the collapsed configuration and operating the actuator to move the alignment dowel to the expanded configuration to align the cells.

The method can further comprise: arranging a plurality of gaskets interposed between adjacent cells, each gasket defining a gasket opening; and locating the alignment dowel in the alignment features and the gasket openings in the collapsed configuration and operating the actuator to move the alignment dowel to the expanded configuration to align the cells and gaskets.

Where the internal alignment features of the cells define a common datum opening, of the method can comprise: arranging the cells and gaskets adjacent one another in a stacked configuration such that the common datum openings and the gasket openings define a passageway; and locating said alignment dowel within the passageway in the collapsed configuration and operating the actuator to move the alignment dowel to the expanded configuration to align the gaskets with the cells.

In certain embodiments of a method according to the present invention, either:
  (a) the resilient vanes are curved in a clockwise direction, the method further comprising rotating the alignment dowel in an anti-clockwise direction to insert the alignment dowel into the passageway, rotating the alignment dowel in a clockwise direction to align the stack of components, and rotating the alignment dowel in an anti-clockwise direction to remove the alignment dowel from the passageway; or
  (b) the resilient vanes are curved in an anti-clockwise direction, the method further comprising rotating the alignment dowel in a clockwise direction to insert the alignment dowel into the passageway, rotating the alignment dowel in an anti-clockwise direction to align the stack of components and rotating the alignment dowel in a clockwise direction to remove the alignment dowel from the passageway.

In certain embodiments of the method, the stack components are constrained to prevent upwards movement. This can be done to prevent stack components moving relative to one another, particularly when the alignment dowel is removed. For example, where the stack components include a plurality of fuel cell units with interposed gaskets, the top fuel cell unit may be constrained to prevent its upward movement. For example, a weight can be placed upon it, or a rigid frame placed on or around it to prevent upward movement of it and other stack components.

Thus, the method may comprise the step of removing the alignment dowel. Furthermore, the method may comprise the step of constraining the stack components to prevent upwards movement when the alignment dowel is removed.

BRIEF DESCRIPTION OF THE DRAWINGS

FIG. 18 shows an alignment dowel according to an eighth embodiment in a collapsed configuration.
FIG. 19 shows an end part of the alignment dowel of FIG. 18.
FIG. 20 shows a tube carrying a resilient vane.

DETAILED DESCRIPTION

Figure 1:
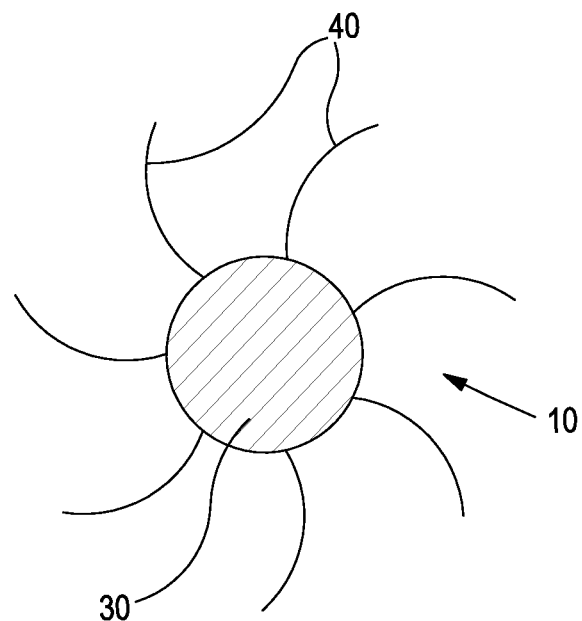
FIG. 1 is a cross-section through a first embodiment of an alignment dowel.
Figure 2:
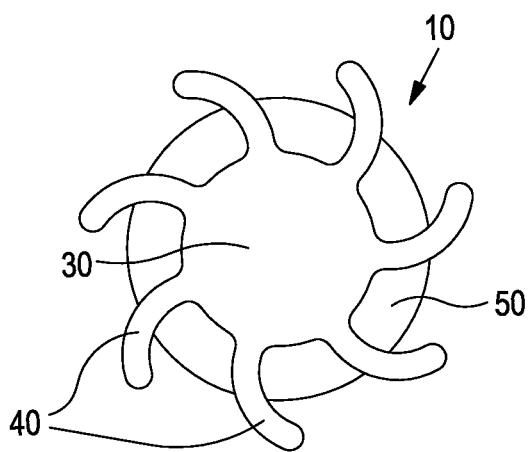
FIG. 2 is an end view of the alignment dowel of FIG. 1.
Figure 3:
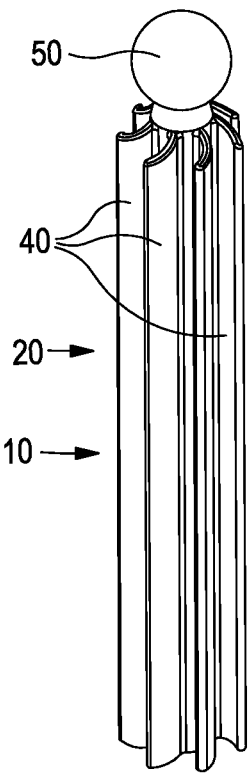
FIG. 3 is a perspective view of the alignment dowel of FIG. 1.
Figure 4:
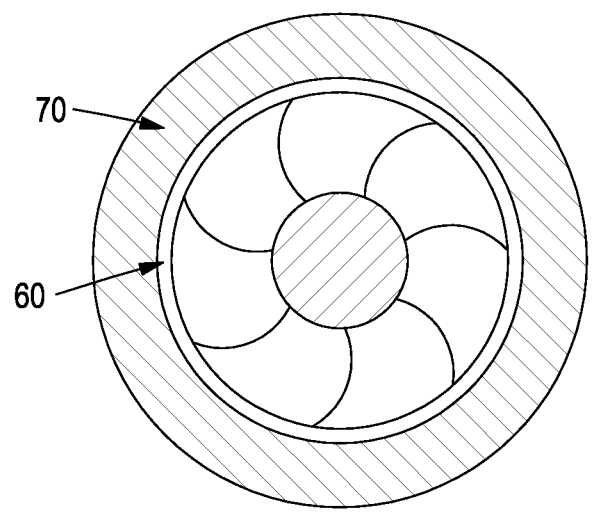
FIG. 4 is a cross-sectional view through the alignment dowel of FIG. 1 in use.

It will be apparent to those of ordinary skill in the art that various modifications and variations can be made in the present invention without departing from the scope of the claims.

1st Embodiment

In the first embodiment (FIGS. 1-6), the alignment dowel 10 comprises a body section 20 comprising a central rod 30 from which extends a set of seven resilient vanes 40 which are curved in a clockwise direction (i.e., resilient vanes 40 are attached to the solid central rod 30 along their length). At one end of the alignment dowel 10 there is located an actuator 50 which is used to insert and remove the alignment dowel 10 from passageways in a stack of components, and to rotate the alignment dowel 10.

A passageway 60 is defined by common datum openings of a plurality of fuel cells (not shown) and gasket openings of corresponding gaskets 70 interposed between adjacent fuel cells. The cells and gaskets are arranged adjacent one another in a stacked configuration.

In use, the alignment dowel 10 is rotated using the actuator 50 in an anti-clockwise direction (when viewed from above) and inserted into the passageway 60, the anti-clockwise rotation reducing friction of resilient vanes 40 with the fuel cells and gaskets and easing insertion. The alignment dowel 10 is then rotated in a clockwise direction to increase the friction on resilient vanes 40. This results in resilient vanes 40 causing any misaligned gaskets 70 to be moved and aligned. The actuator 50 has a smaller diameter than the outer diameter of resilient vanes 40.

Figure 12:
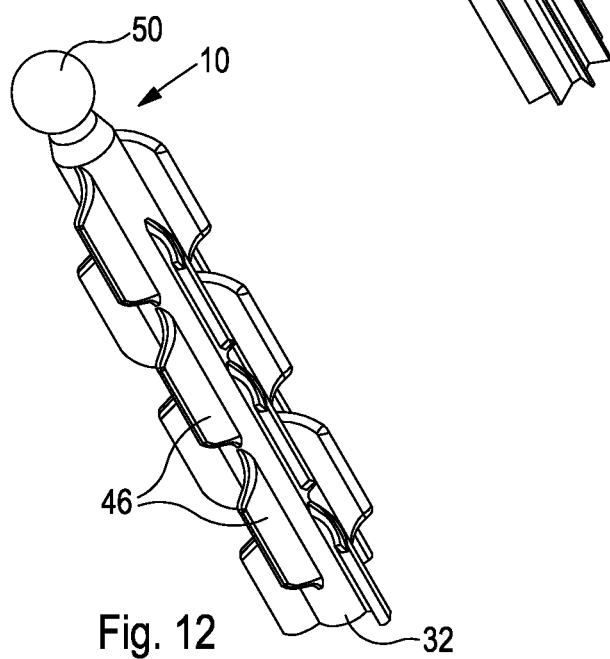
FIG. 12 is a perspective view of a fourth embodiment of an alignment dowel.

In this embodiment, the vanes 40 have a continuous surface. In other embodiments (see, e.g., FIG. 12), vanes can be slotted.

Figure 5:
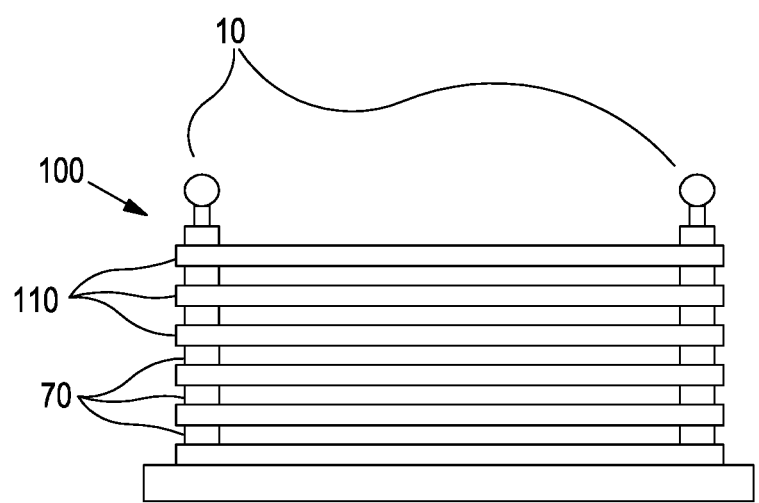
FIG. 5 shows a partially assembled fuel cell stack with alignment dowels of FIG. 1 inserted.
Figure 6:
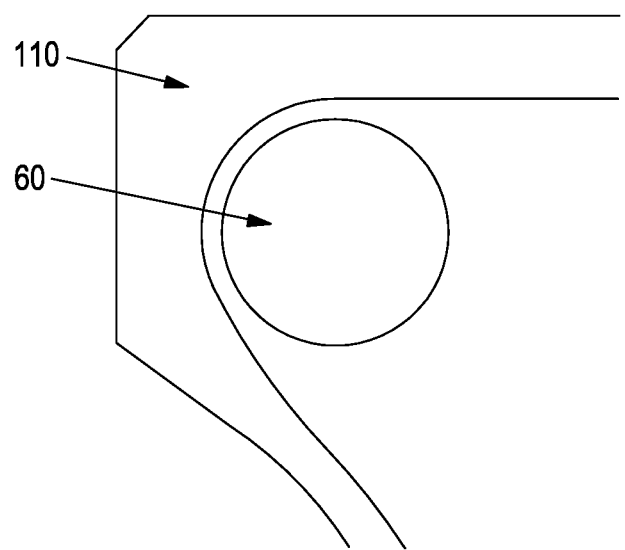
FIG. 6 shows a partial top view of a metal supported solid oxide fuel cell unit of the partially assembled fuel cell stack of FIG. 5 without an alignment dowel inserted in the passageway.
Figure 7:
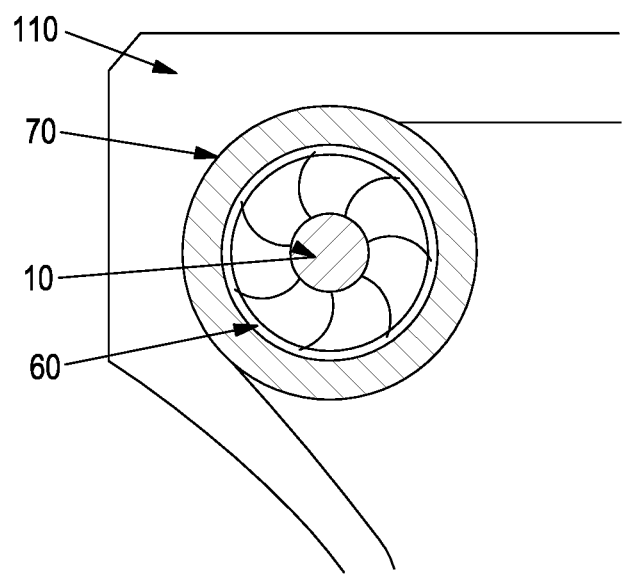
FIG. 7 shows a partial top view of a metal supported solid oxide fuel cell unit of the partially assembled fuel cell stack of FIG. 5, with a section through an alignment dowel inserted in the passageway.

As shown in FIGS. 5-7, a partially assembled fuel cell stack 100 comprises a metal supported solid oxide fuel cell units 110 with interposed gaskets 70. Examples of metal supported solid oxide fuel cell units 110 are described in WO 2019/034855.

Each fuel cell unit 110 defines passageways 60 (fuel ducts). In this example there is one in each corner. An alignment dowel 10 is inserted in each passageway 60. The fuel cell units 110 are rigidly aligned against a hard external datum (not shown). but the gaskets 70 are free to move relative to the fuel cell units 110 and are constrained by the mass of fuel cell unit(s) 110 on top of them. The alignment dowels 10 act to provide a soft datum against which the gaskets 70 are aligned—when a predetermined number of fuel cell units 110 and interposed gaskets 70 have been stacked, an alignment dowel 10 is inserted into each passageway 60 and actuated to align gaskets 70 with fuel cell units 10. The alignment dowels 10 are then removed from the passageways 60.

2$^{nd}$ Embodiment

Figure 8:
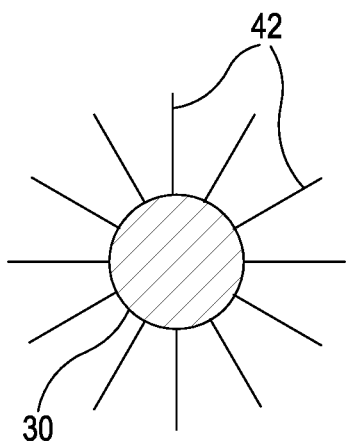
FIG. 8 is a cross-section through a second embodiment of an alignment dowel.
Figure 9:
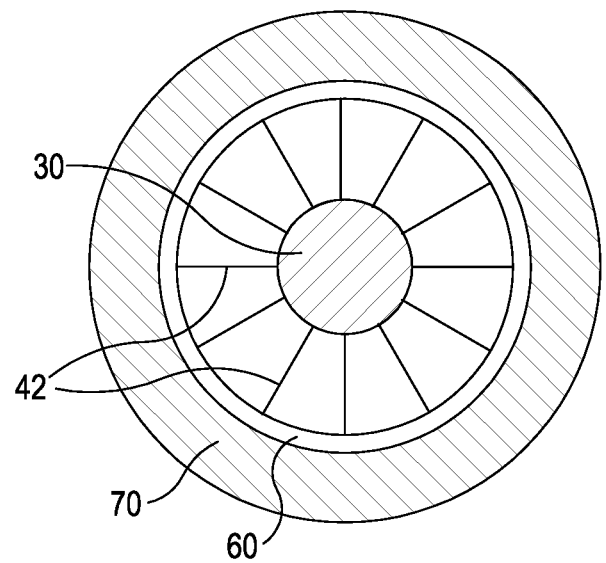
FIG. 9 is a cross-section through the alignment dowel of FIG. 8 in use.

The second embodiment (FIGS. 8 and 9) corresponds generally to the first embodiment. In the second embodiment the resilient vanes 42 are not pre-curved, i.e., are substantially radial in the expanded/unconstrained configuration.

3$^{rd}$ Embodiment

Figure 10:
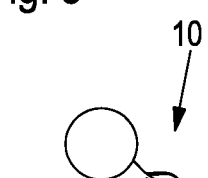
FIG. 10 is a perspective view of a third embodiment of an alignment dowel.
Figure 11:
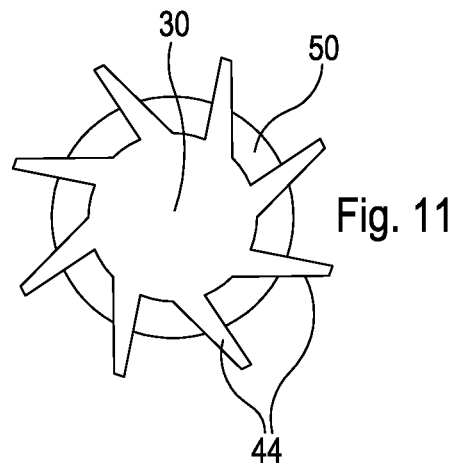
FIG. 11 is an end view of the dowel of FIG. 10.

The third embodiment (FIGS. 10 and 11) corresponds generally to the first embodiment. In the third embodiment the resilient vanes 44 are angled relative to the radial direction (as opposed to, e.g., being curved as in the first embodiment).

4$^{th}$ Embodiment

Figure 13:
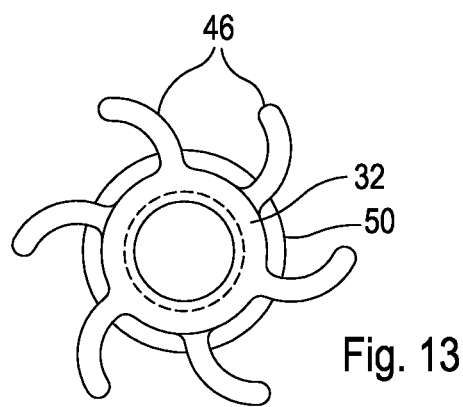
FIG. 13 is an end view of the dowel of FIG. 12.

The fourth embodiment (FIGS. 12 and 13) corresponds generally to the first embodiment. In the fourth embodiment the resilient vanes 46 are intermittent (they can also be described as being "slotted"), and the central rod 32 is hollow.

5$^{th}$ Embodiment

Figure 14:
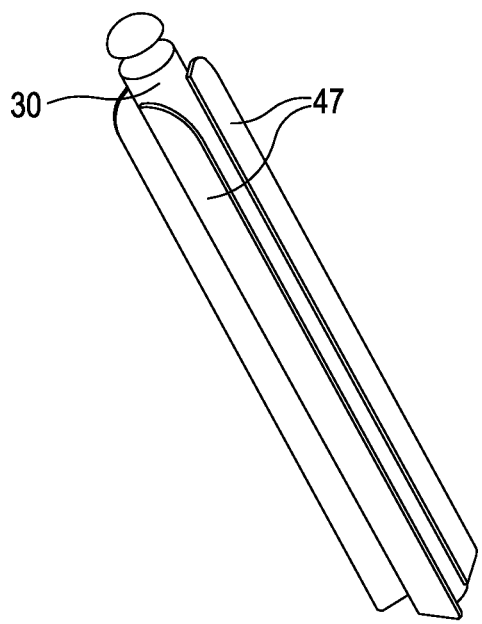
FIG. 14 is a perspective view of a fifth embodiment of an alignment dowel with three vanes.
Figure 15:
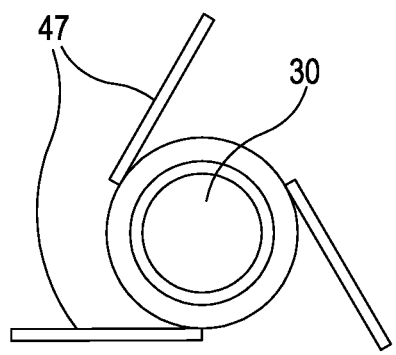
FIG. 15 is an end view of the dowel of FIG. 14.

The fifth embodiment (FIGS. 14 and 15) corresponds generally to the first embodiment. The fourth embodiment comprises three resilient vanes 47 which are fabricated from spring steel and project tangentially from the central rod 30.

6$^{th}$ Embodiment

Figure 16:
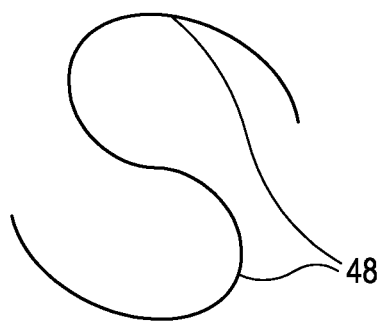
FIG. 16 is a cross-section through a sixth embodiment of an alignment dowel.

The sixth embodiment (FIG. 16) differs from the previous embodiments in that it does not comprise a central rod. Instead, the body comprises two curved resilient vanes 48 which are joined directly to one another along long edges.

7$^{th}$ Embodiment

Figure 17:
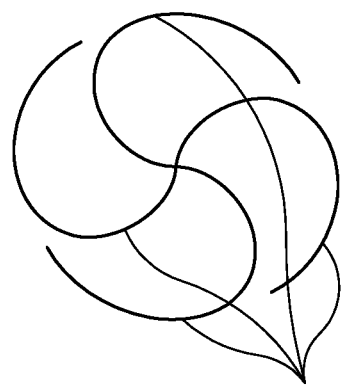
FIG. 17 is a cross-section through a seventh embodiment of an alignment dowel.
Figure 22:
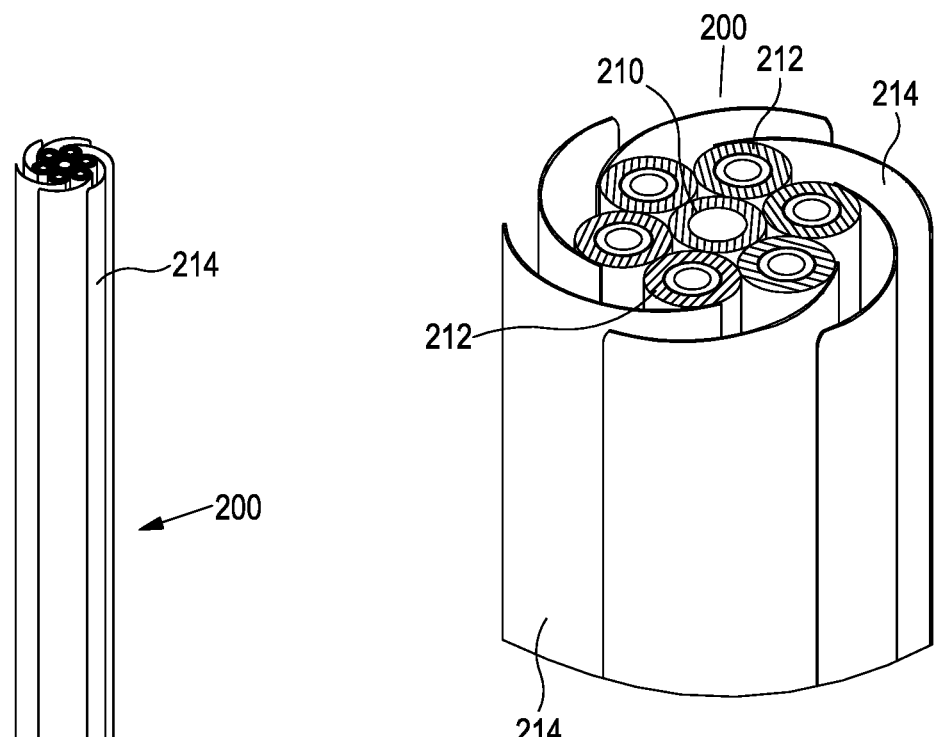
FIG. 22 shows an end part of the alignment dowel of FIG. 21.

The seventh embodiment (FIG. 17) is similar to the sixth embodiment in that it does not comprise a central rod. In the seventh embodiment the body comprises four curved resilient vanes 49 which are joined directly to one another along long edges.

8$^{th}$ Embodiment

FIGS. 18-23 show an eighth embodiment of an alignment dowel 200. The dowel comprises a central rod 210 mounted in a base 211 with a series of tubes 212 arranged around the exterior of the rod 210. The rod 210 and tubes 212 are substantially parallel. The rod 210 and tubes are shown as hollow but can also be solid. Each tube 212 carries a resilient vane 214 connected to its outer surface. Each vane 214 extends tangentially from its tube 212 and is curved. When arranged around the central rod 210, the vanes 214 all project and curve in the same direction and adjacent vanes are overlapped.

Figure 21:
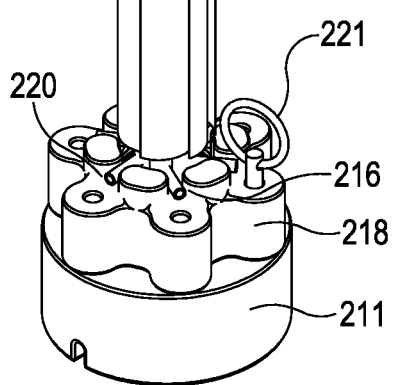
FIG. 21 shows the alignment dowel of FIG. 18 in an expanded configuration.

Each tube 212 can be rotated around its longitudinal axis. This has the effect of adjusting the amount by which each vane 214 projects in the radial direction. In the embodiment shown, when viewed from above, rotation of the tubes 212 in an anti-clockwise direction causes the vanes 214 to project more so that the outer diameter of the dowel increases. Conversely, rotation in a clockwise direction causes the vanes 214 to project less. FIGS. 18 and 19 show the dowel in a collapsed configuration (lower outer diameter) and FIGS. 20 and 21 show the same dowel in an expanded configuration (higher outer diameter).

Each tube 212 has a formation in the form of a radially projecting peg 216 at its lower end that extends outwardly from the dowel. An actuator in the form of a rotatable collar 218 is mounted at the bottom of the dowel. The collar 218 has a series of cut-out formations 220 around the end of the dowel. A peg 216 engages in each cutout 220. Rotating the collar 218 relative to the central rod 210 causes the cutouts to move the pegs to one side or the other. This in turn causes the tubes to rotate and expand or collapse the vanes 212. The collar can be locked in the expanded or collapsed position by means of a locating pin 221. Other arrangements of formations can also be used. For example, the positions of the pegs and cutouts could be reversed, or a toothed gear arrangement could be used.

Figure 23:
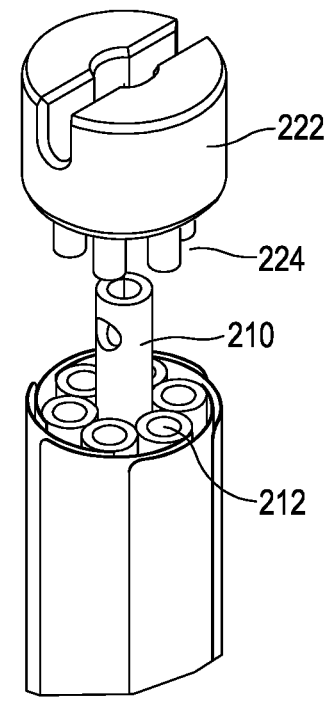
FIG. 23 shows a top bracket for use with the alignment dowel of FIG. 18.

A bracket 222 is located at the top of the dowel (shown separated in FIG. 23). The bracket is secured to the central rod 210 and has projecting formations 224 that engage in the ends of the tubes 212 to hold them in position relative to the rod 210 while allowing them to rotate about their longitudinal axis.

FIGS. 24-28 show a stack assembly jig comprising dowels according to the eighth embodiment. The jig 230 has a tool base 232 for supporting the stack of components. The tool base 232 has a series of guide holes 234 what are arranged to correspond to the layout of passages 60 in the fuel cell units 110. A base plate 236 is positioned below the tool base 232. The base plate 236 has dowels 200 mounted on an upward-facing surface and arranged to correspond to the arrangement of guide holes 234 in the tool base 232.

Figure 24:
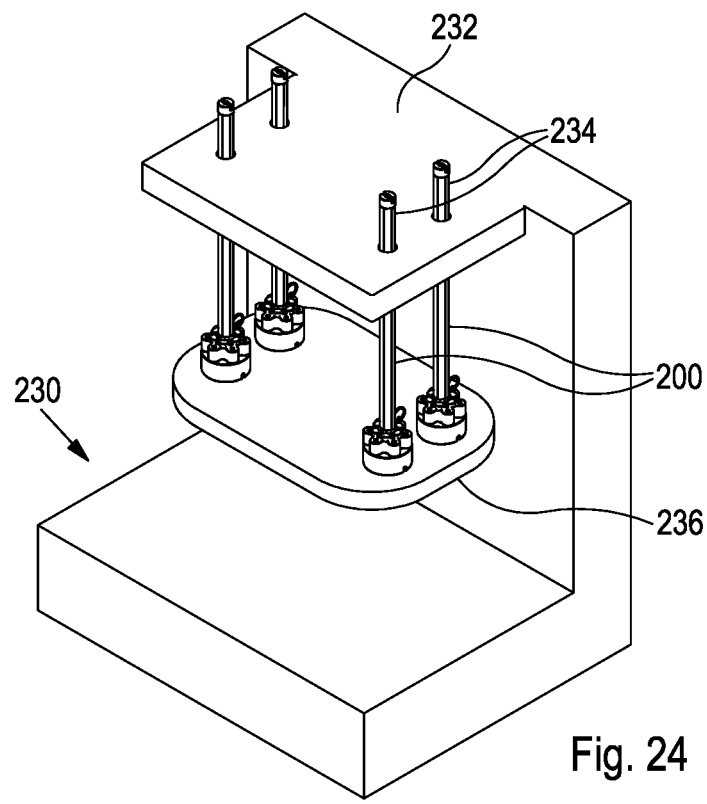
FIG. 24 shows a stack assembly jig.
Figure 25:
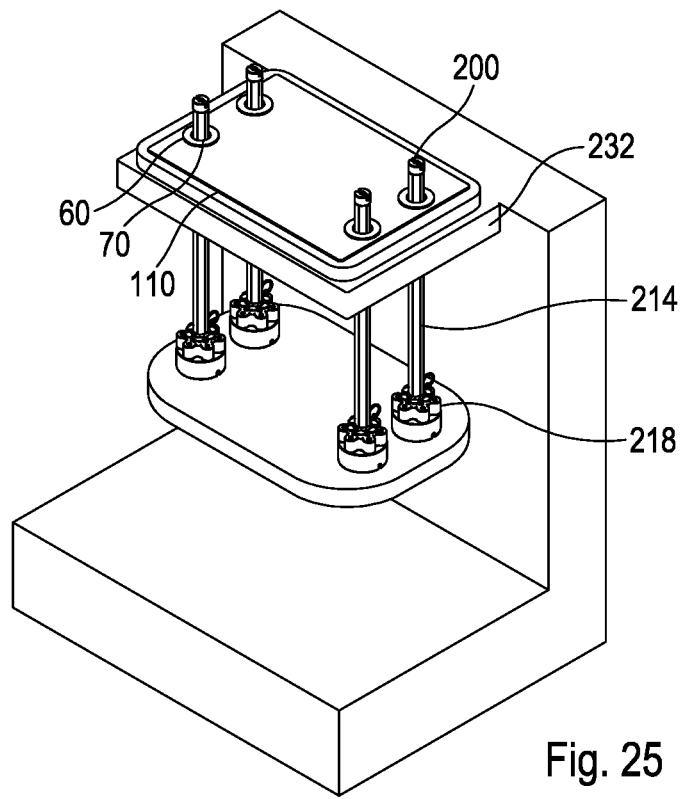
FIGS. 25-28 show the stack assembly jig of FIG. 24 in the stages of assembly of a cell stack.
Figure 26:
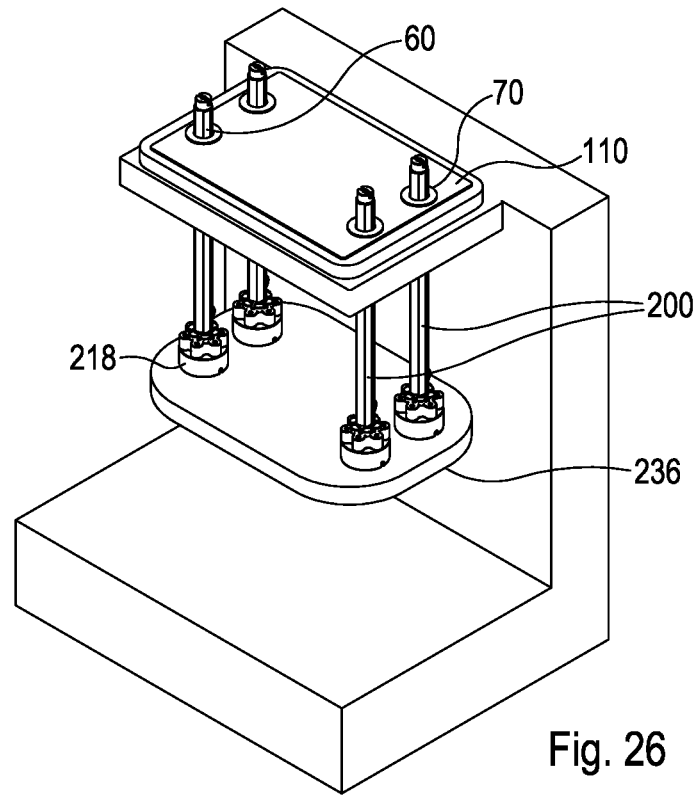
Figure 27:
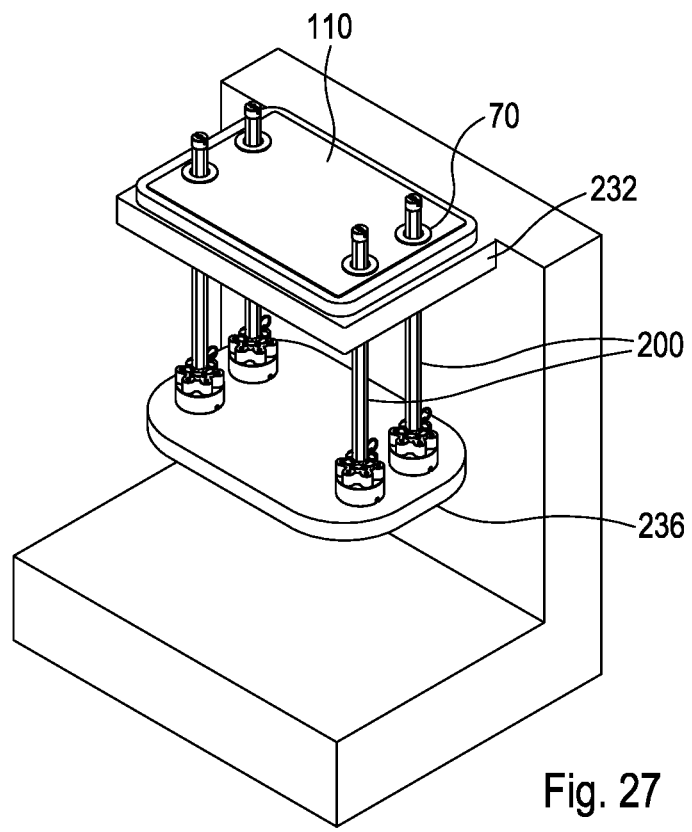
Figure 28:
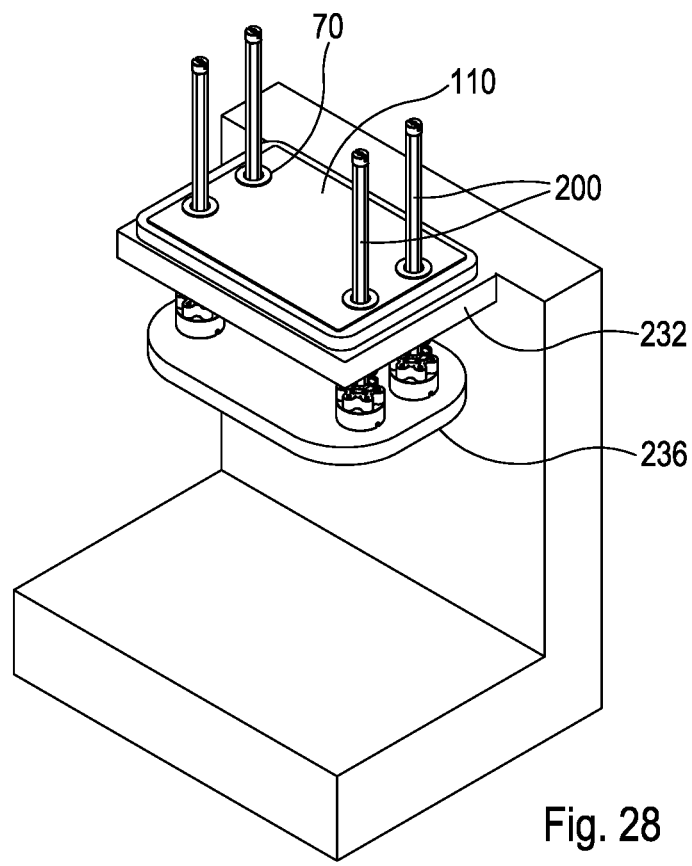

In an initial position, the dowels 200 are in the collapsed configuration and project partially through the guide holes 234 (FIG. 24). Fuel cell units 110 and gaskets 70 are placed over the dowels 200 to rest on the tool base 232 (FIG. 25). Each dowel 200 is actuated into the expanded configuration by rotation of the collars 218 so that the vanes 214 are moved outwards to engage with the inner surfaces of the passageways 60 in the fuel cell units 110 and gaskets 70 so as to urge them into alignment (FIG. 26). The dowels 200 are then actuated into the collapsed configuration (FIG. 27). At this point, further fuel cell units 110 and gaskets 70 can be placed over the dowels 200 to increase the size of the stack. Additionally, or alternatively, the base plate 236 can be raised so that the dowels 200 project further through the guide holes 234 to allow further fuel cell units 110 and gaskets 70 can be placed over the dowels 200 to increase the size of the stack (FIG. 28). Once the stack is complete, the dowels 200 are returned to the collapsed configuration, the base plate 236 lowered, and the stack removed.

9$^{th}$ Embodiment

Figure 29:
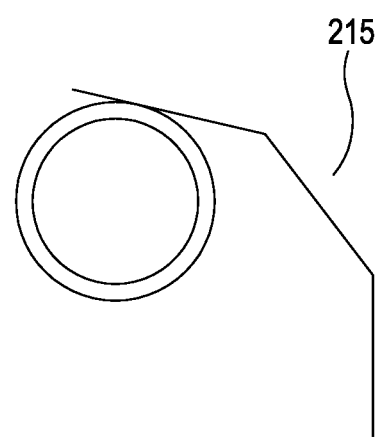
FIG. 29 shows a further form of vane.

The ninth embodiment (FIG. 29) is similar to the eight embodiment. However, in this case, the vanes 215 are bent rather than curved, i.e., each blade is formed of a substantially flat portion with one or more bends so that the blade is deviated from a single plane. Combinations of flat portions, bends, and curves can also be used to achieve the same effect.

Various modifications, adaptations and alternative embodiments will be readily apparent to the person of ordinary skill in the art without departing from the scope of the appended claims.

The invention claimed is:

1. A method for aligning a plurality of components of a cell stack using an alignment dowel, wherein the alignment dowel comprises:
an elongate body extending along a longitudinal axis, the body comprising resilient elongate vanes arranged around the longitudinal axis so as to extend along the longitudinal axis and project radially outwards from the longitudinal axis to define an outer diameter of the body, and
an actuator portion;
wherein the actuator portion is operable to move the vanes between a collapsed configuration in which the outer diameter is smaller than a predetermined diameter, and an expanded configuration in which the outer diameter of the body is greater than in the collapsed configuration;
the method comprising:
arranging a plurality of cells adjacent one another in a stacked configuration, wherein the cells have internal alignment features provided within components of each cell that allow them to be aligned relative to one another, wherein each alignment feature includes an engaging surface with which the vanes of the alignment dowel are configured to selectively engage and disengage when located within said alignment feature; and
locating the alignment dowel in the alignment features in the collapsed configuration and operating the actuator to move the vanes of the alignment dowel to the expanded configuration to engage the engaging surfaces of the alignment features to align the cells.

2. A method according to claim 1, further comprising:
arranging a plurality of gaskets interposed between adjacent cells, each gasket defining a gasket opening; and
locating the alignment dowel in the alignment features and the gasket openings in the collapsed configuration and operating the actuator to move the alignment dowel to the expanded configuration to align the cells and gaskets.

3. A method according to claim 1, wherein the internal alignment features of the cells define a common datum opening, of the method comprising:
arranging the cells and gaskets adjacent one another in a stacked configuration such that the common datum openings and the gasket openings define a passageway; and
locating said alignment dowel within the passageway in the collapsed configuration and operating the actuator to move the alignment dowel to the expanded configuration to align the gaskets with the cells.

4. A method according to claim 1, wherein the alignment dowel comprises at least three resilient vanes.

5. A method according to claim 4, wherein each resilient vane is curved, and all vanes are curved in the same direction.

6. A method according to claim 4, wherein each resilient vane is bent, and all vanes are bent in the same direction.

7. A method according to claim 1, wherein the body comprises a central rod which carries the resilient vanes that extend outward from the rod.

8. A method according to claim 7, wherein the resilient vanes are attached to the rod along their length.

9. A method according to claim 7, wherein the resilient vanes form a spiral around the rod.

10. A method for assembling a stack of components comprising:
aligning a plurality of components of a cell stack using an alignment dowel, comprising:
arranging a plurality of cells adjacent one another in a stacked configuration, wherein the cells have internal alignment features provided within components of each cell that allow them to be aligned relative to one another, wherein each alignment feature includes:
an engaging surface with which the alignment dowel is configured to selectively engage and disengage when located within said alignment feature; and
locating the alignment dowel in the alignment features in the collapsed configuration and operating the actuator to move the alignment dowel to the expanded configuration to align the cells;
wherein the alignment dowel comprises:
an elongate body extending along a longitudinal axis, the body comprising resilient elongate vanes arranged around the longitudinal axis so as to extend along the longitudinal axis and project radially outwards from the longitudinal axis to define an outer diameter of the body, and
an actuator portion;
wherein the actuator portion is operable to move the vanes between a collapsed configuration in which the outer diameter is smaller than a predetermined diameter, and an expanded configuration in which the outer diameter of the body is greater than in the collapsed configuration;
the method further comprising assembling a stack of components using an assembly jig comprising:
a tool base on which a stack of components can be positioned, wherein the components define openings of the predetermined diameter and the tool base defines guide holes that are no smaller than the predetermined diameter and are positioned to correspond to the position of the openings of the components in the stack; and a base plate carrying an array of alignment dowels, wherein the alignment dowels are arranged to correspond to the positions of the guide holes;
wherein the base plate is moveable relative to the tool base such that the alignment dowels can project through the guide holes and into the component openings, and wherein the actuators are operable to align the components in the stack;
wherein the method comprises:
positioning a stack of components on the tool base such that the openings overlap with the guide holes;
moving the base plate with the vanes on the dowels in the collapsed configuration so that the dowels project through the guide holes and the openings; and
operating the actuators so that the vanes move to the expanded configuration so as to align the components.

11. A method according to claim 10, wherein the base plate is located below the tool base and can be raised so that the alignment dowels project into the component openings.

12. A method according to claim 10, further comprising, after alignment of the components:
operating the actuator to return the vanes to the collapsed configuration;
adding further components to the stack so that the dowels project through the openings of the further components; and
operating the actuators so that the vanes move to the expanded configuration so as to align the further components.

13. A method according to claim 12, further comprising moving the base plate closer to the tool base so that the dowels project further from the tool base as the height of the stack increases.

14. A method for aligning a plurality of components of a cell stack using an alignment dowel, comprising:
arranging a plurality of cells adjacent one another in a stacked configuration, wherein the cells have internal alignment features provided within components of each cell that allow them to be aligned relative to one another, wherein each alignment feature includes:
an engaging surface with which the alignment dowel is configured to selectively engage and disengage when located within said alignment feature; and
locating the alignment dowel in the alignment features in the collapsed configuration and operating the actuator to move the alignment dowel to the expanded configuration to align the cells;
wherein the alignment dowel comprises:
an elongate body extending along a longitudinal axis, the body comprising resilient elongate vanes arranged around the longitudinal axis so as to extend along the longitudinal axis and project radially outwards from the longitudinal axis to define an outer diameter of the body, and
an actuator portion;
wherein the actuator portion is operable to move the vanes between a collapsed configuration in which the outer diameter is smaller than a predetermined diameter, and an expanded configuration in which the outer diameter of the body is greater than in the collapsed configuration;
wherein the alignment dowel further comprises a central rod and an array of elongate tubes arranged around the rod, wherein each tube is substantially parallel to the rod and carries a resilient vane that projects outward from the array.

15. A method according to claim 14, wherein each vane projects tangentially from the tube on which it is carried.

16. A method according to claim 14, wherein the alignment dowel comprises at least three tubes.

17. A method according to claim 14, wherein each resilient vane is curved, and all vanes are curved in the same direction.

18. A method according to claim 14, wherein each resilient vane is bent, and all vanes are bent in the same direction.

19. A method according to claim 14, wherein each tube can be rotated so as to adjust the outward projection of its vane and so adjust the outer diameter of the body.

20. A method according to claim 19 wherein the actuator comprises a rotatable collar positioned around a first end of the array, wherein each tube includes a formation at a first end that engages in a corresponding formation in the collar such that rotation of the collar relative to the array acts to rotate each tube to adjust the outer diameter of the body.

21. A method according to claim 20, wherein the dowel further comprises a bracket positioned at a second, opposite end of the array, wherein the bracket includes formations that engage with the tubes to maintain the tubes parallel to the central rod.

* * * * *